Aug. 2, 1966  G. A. CONGER  3,263,282

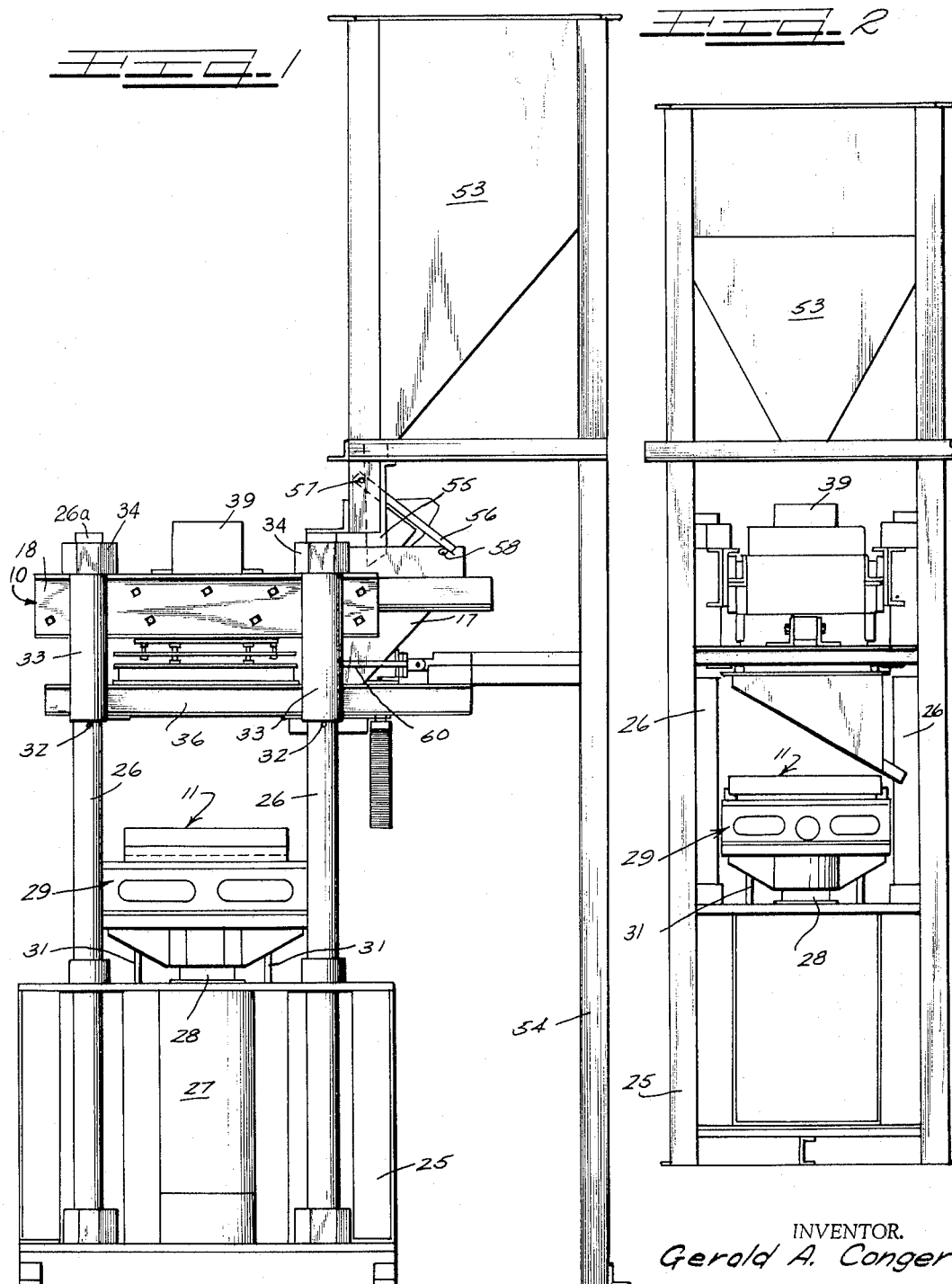

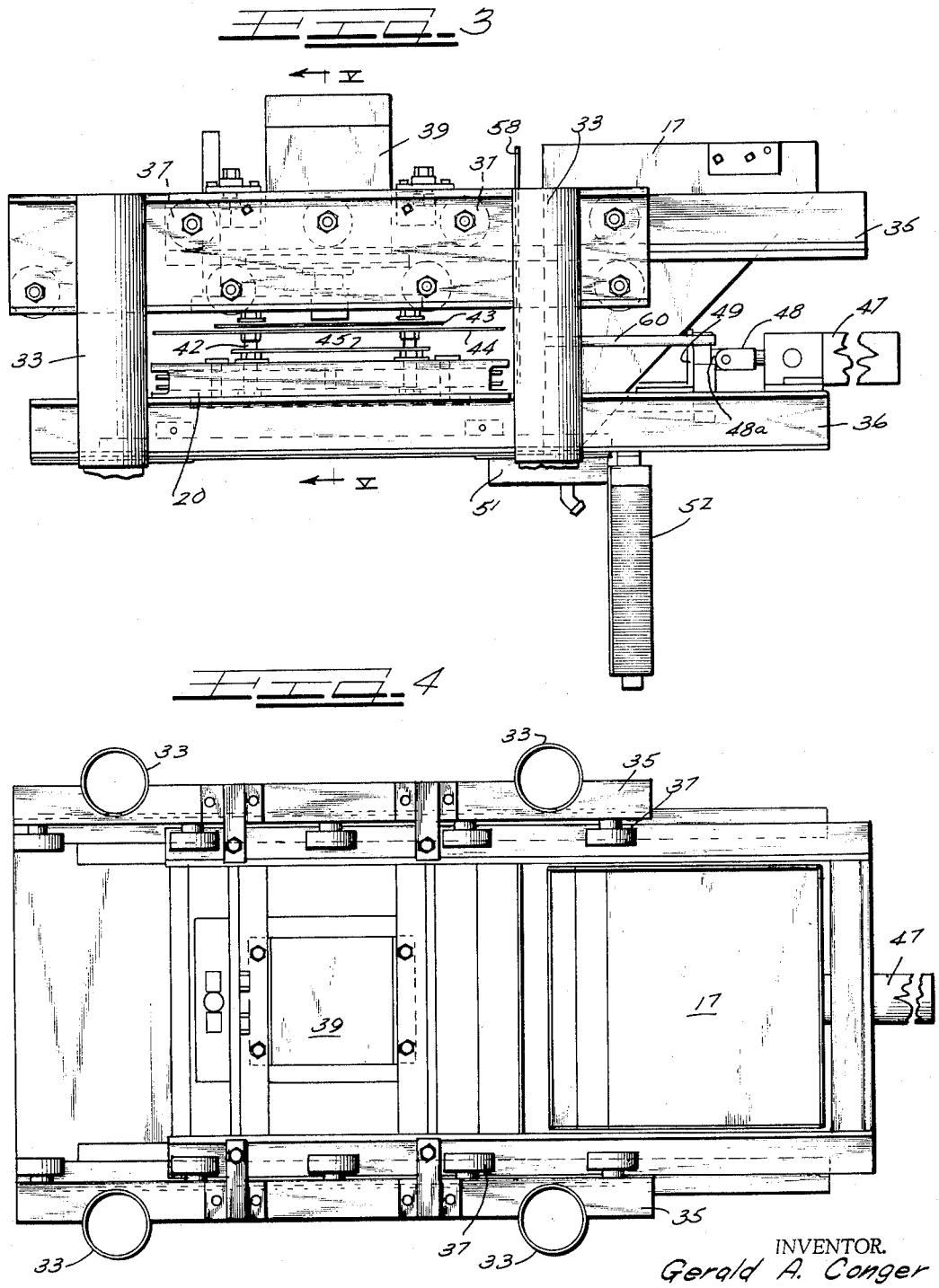

PRESS MACHINE FOR FORMING FOUNDRY MOLDS OR CORES

Filed Oct. 23, 1963  5 Sheets-Sheet 3

INVENTOR.
Gerald A. Conger
BY
Hill, Sherman, Meroni, Gross & Simpson
ATTORNEYS

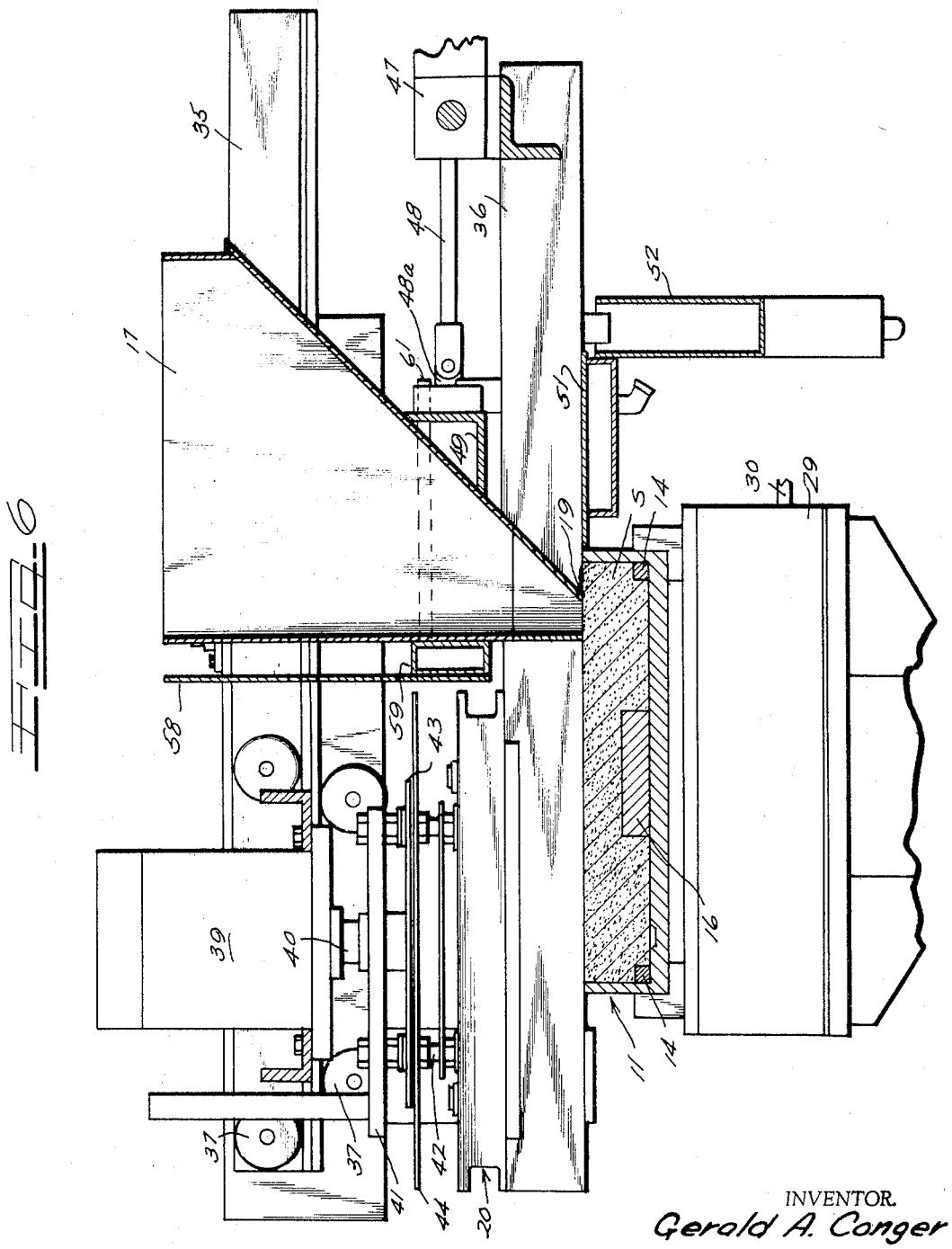

Aug. 2, 1966  G. A. CONGER  3,263,282
PRESS MACHINE FOR FORMING FOUNDRY MOLDS OR CORES
Filed Oct. 23, 1963  5 Sheets-Sheet 5
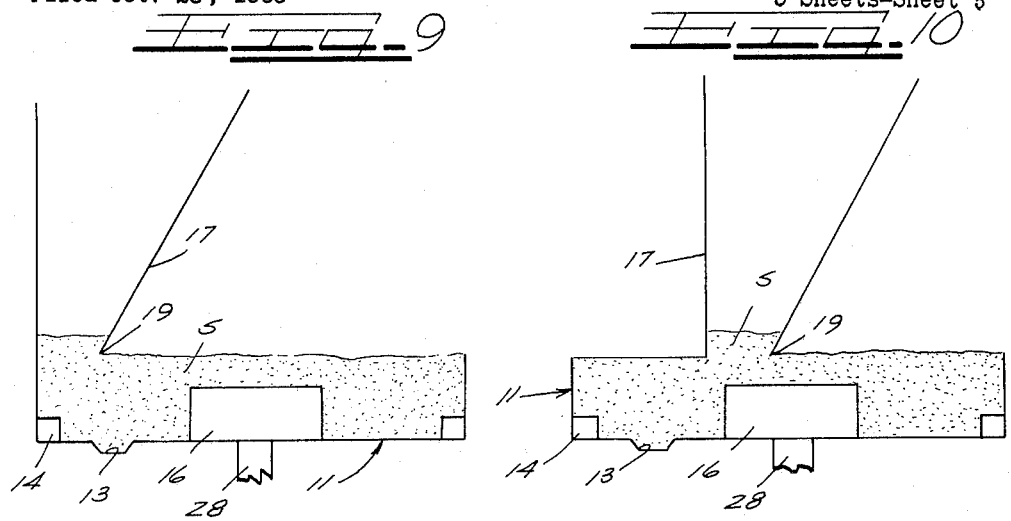
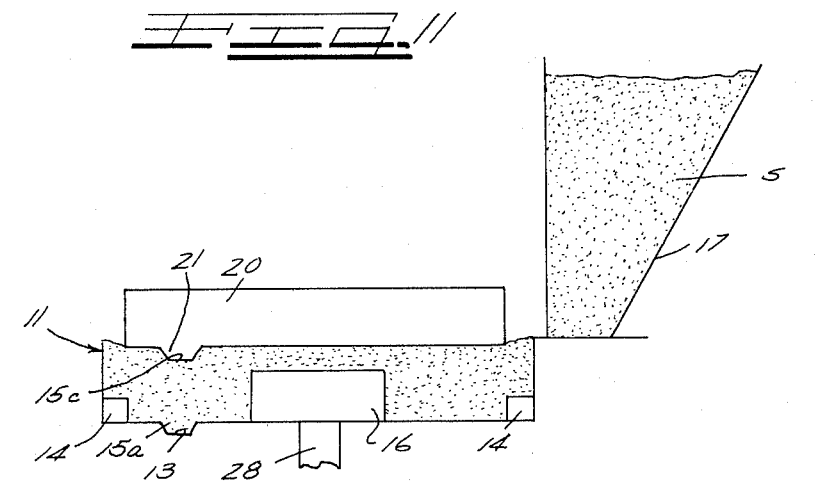
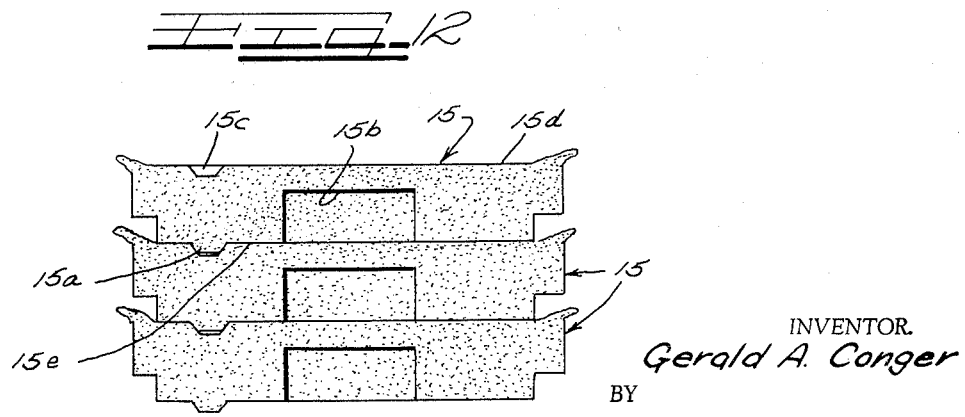
INVENTOR.
Gerald A. Conger
BY
ATTORNEYS United States Patent Office 3,263,282
Patented August 2, 1966

3,263,282
PRESS MACHINE FOR FORMING FOUNDRY MOLDS OR CORES
Gerald A. Conger, Park Ridge, Ill., assignor to Barber-Greene Company, Aurora, Ill., a corporation of Illinois
Filed Oct. 23, 1963, Ser. No. 318,231
2 Claims. (Cl. 22—35)

The present invention relates generally to a new and improved method and apparatus for forming foundry molds or cores. The molds and cores which are to be produced in accordance with the method and apparatus herein disclosed are to be made from what is commonly known as shell sand, or shell mold sand, or hot-coated shell sand. In accordance with the method and apparatus herein disclosed, shell sand is spread while being moved horizontally and is progressively released and allowed to fall vertically and be spread into the core box.

The present machine and method can be used by any foundry to form a mold to pour any metal casting, but is generally confined to molds to make castings which have one short dimension, which dimension may be on the order of 1¼ inches or less. Preferably, the machine is used for forming stack-type molds or flat-back cores.

In the past, molds for forming castings have been made by conventional processes from green sand. The thin green sand molds are stacked one on top of the other and the top surface of the bottom mold is used as a bottom casting surface of the mold disposed thereon. In the practice of the prior methods, it has not been possible to make shell molds economically with upper and lower surfaces dimensioned in accordance with predetermined dimensions. At the present time, shell molds are made by "dumping" sand onto a hot pattern and "dumping" off the excess sand from the outer surface leaving it irregular and rough. Blown molds can be used and desirable surface characteristics can be obtained, but it has been found to be a more expensive process and it is difficult to produce molds having the desired solidarity.

In the development of the machine and method herein disclosed, an effort has been made to discover a method and apparatus for making the top and bottom surfaces of the mold smooth at a minimum of expense. A further effort has been made to eliminate excessive motions in manipulating the core box for dumping and redumping the sand. In order to overcome these difficulties, the present apparatus and method have been developed employing a stationary core box adapted to receive sand by a spreading operation permitting the sand to flow by gravity out of the open end of a hopper, the sand being confined only by the angle of repose. The hopper is adapted to move backwards across the spread sand in a smoothing operation whereupon the sand is further contoured by a heated plate positioned over the core box.

An important object of this invention is to provide a new and improved method and apparatus for manufacturing molds from shell sand or thermosetting sand.

A further object of this invention is to provide a more economical method and apparatus for manufacturing molds for stacking or flat-back molds or cores.

Yet another object of this invention is to provide a new and improved method and apparatus for manufacturing molds which eliminates excessive motions in manipulating the core box to avoid dumping and redumping of the sand.

A still further object of this invention is to provide a new and improved method and apparatus for spreading and pressing sand in a core box.

An important feature of this invention is to provide a new and improved method and apparatus for utilizing a hopper not only to spread sand in a core box, but also utilizing the hopper to strike the sand in the core box to form a smooth upper surface.

Other objects and features of this invention will more fully become apparent in view of the following detailed description taken in conjunction with the accompanying drawings illustrating therein several embodiments and in which:

FIGURE 1 is a front view of an apparatus for manufacturing molds;

FIGURE 2 is a side elevation of the apparatus shown in FIGURE 1;

FIGURE 3 is an enlarged fragmentary detail view illustrating the carriage and its manner of support;

FIGURE 4 is a top plan view of the structure shown in FIGURE 3;

FIGURE 6 is an enlarged fragmentary partially sectioned view illustrating the manner in which the spread hopper is used to fill and level the core sand in the mold;

FIGURE 9 is a diagrammatic view similar to FIGURE 8 only showing the realtive position of the spread hopper and the core box after the core box has been filled with sand;

FIGURE 10 is a diagrammatic view similar to FIGURE 9 only illustrating the manner in which the spread hopper is used as a strike;

FIGURE 11 is a diagrammatic view illustrating the manner in which the spread sand is pressed and compacted in the core box; and FIGURE 12 is a vertical section of a series of molds disposed in stacked relation after having been formed on the apparatus and in accordance with the method herein disclosed.

As shown on the drawings:

Figure 5:
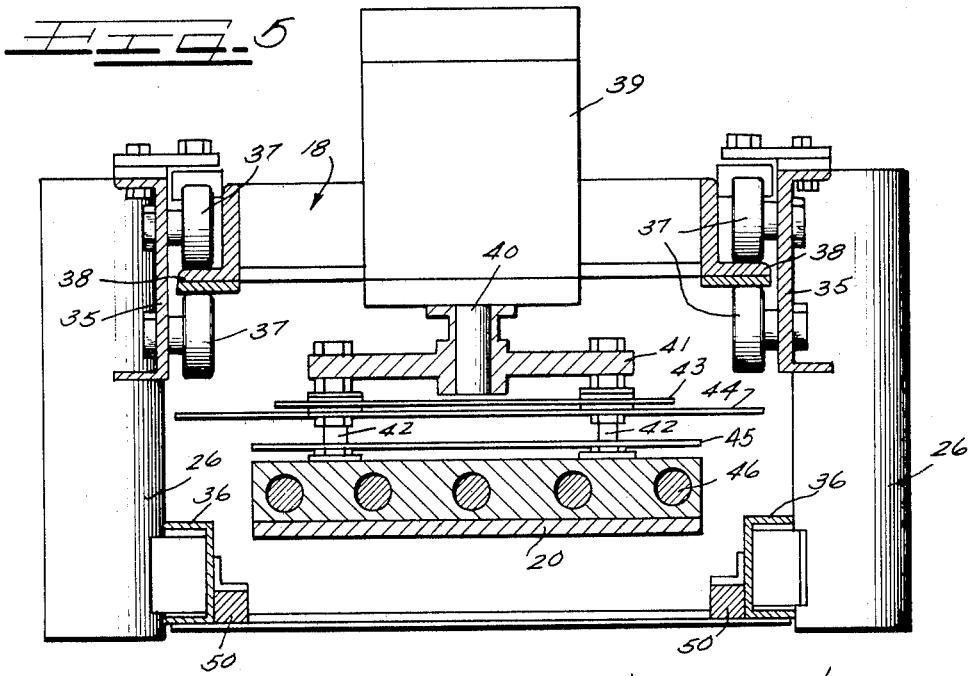
FIGURE 5 is an enlarged view with parts shown in section taken on the line V—V looking in the direction indicated by the arrows as seen in FIGURE 3.

The reference numeral 10 indicates generally my spread press machine or apparatus. The apparatus 10 has a core box 11 mounted thereon and which is more clearly shown in FIGURE 7. The core box 11 has a relatively flat bottom 12 which may be interrupted by a groove 13 for forming a mold lock leg, if desired. The relatively flat bottom 12 may further be interrupted, if desired, by pattern blocks 14 for forming contoured side surfaces on a flat back stack type mold 15 (FIGURE 12). From an examination of the mold 15, it will be seen that the groove 13 enables the lock leg 15a to be formed on the mold. A pattern 16 is disposed within the core box 11 to form a mold cavity 15b in the mold 15. The pattern may be of any suitable shape depending upon the contour of the article to be formed. The article formed may constitute rods or magnets formed in accordance with the method and apparatus disclosed in my copending U.S. application Serial No. 282,280, filed May 22, 1963.

The apparatus 10 may be operated by pouring sand S precoated with a resin for use in the "shell molding" process. This material may comprise a mixture of sand and powdered resin, and when required, a powdered resin curing or accelerating agent may be applied against the face of a heated press plate which will be hereafter described. A phenol-formaldehyde resin may be used, examples of which are commercially available as BRR 5655 produced by Union Carbide Plastics Company, a division of Union Carbide Corporation, and 19207 Durez, a product of Durez Plastics Division, Hooker Chemical Company, of Tonawanda, New York.

It will be noted that the thermosetting sand S is disposed in a spread hopper 17 mounted on a carriage 18.

Figure 7:
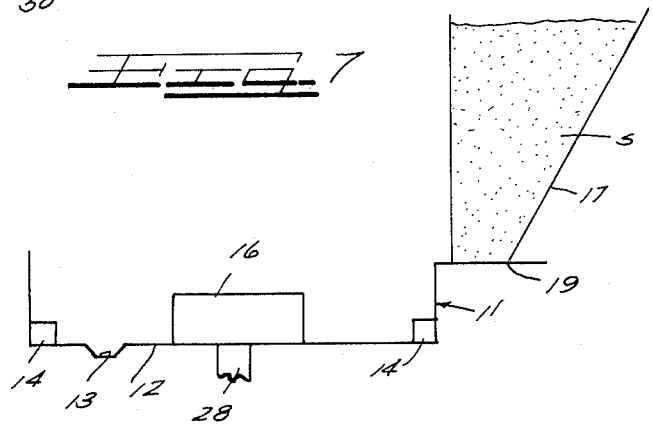
FIGURE 7 is a diagrammatic view illustrating the relative position of the core box and the spread hopper just prior to the filling of the core box.
Figure 8:
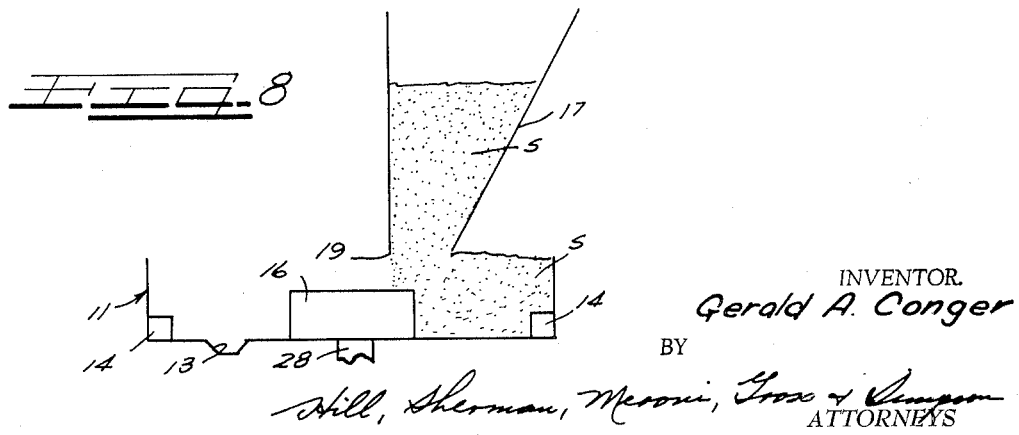
FIGURE 8 is a diagrammatic view similar to FIGURE 7 only illustrating the manner in which the core box is filled.

The hopper 17 has an outlet through which the sand passes as the hopper is moved horizontally over the core box as illustrated in FIGURES 7, 8 and 9. After the core box is filled with the desired amount of sand, the hopper is retracted and the hopper outlet 19 or a lower edge portion thereof is utilized as a strike to smooth the top surface of the sand disposed in the core box. Relative movement is then brought about between the core box 11 and a heated press plate 20 to form the mold 15 to final shape. The press plate 20 has a groove forming rib 21 for forming a lock leg receiving groove 15c in an upper surface of the mold 15. In the formation of the mold 15, it will further be appreciated that the core box 11 is preferably heated in order to more uniformly cure the thermosetting sand disposed therein, as will be further discussed hereafter.

An examination of the mold 15 produced on the apparatus 10 and in accordance with my method will reveal that the mold is provided with relatively flat upper and lower surfaces 15d and 15e which facilitate stacking of the molds in the manner illustrated in FIGURE 12.

The machine 10 includes a base 25 and four posts 26 are suitably secured with the base and extend vertically above the base as shown in FIGURE 1. Also carried upon the base is a pneumatic cylinder 27 having a piston rod 28 which extends vertically above the base and is secured with the core box 11. Suitable controls are provided for operating the cylinder 27 so that after the mold 15 has been formed, the core box will be dropped through the operation of the pneumatic cylinder 27 from its position shown in FIGURE 6 into the position shown in FIGURE 1 for the purpose of ejecting the formed mold 15 from the core box. The core box 11 is supported upon a core box supporting structure 29 which contains a series of gas burners of any suitable type that are supplied with gas through the gas inlet line 30. The gas burners along with the press plate 20 provide means for heating the core box to cure the thermosetting sand to form a cured mold. A series of strippers 31 are mounted on base plate 15a and extend vertically above the base for ejecting the mold 15 from the core box. It will thus be appreciated that as the piston rod 28 is retracted, the core box 11 is dropped and the strippers 31 are caused to engage the formed mold 15 and to remove the mold from the core box 11.

The posts 26 are provided with a series of carriage support pins 32 which support the carriage 18 thereon. The carriage 18 includes a series of carriage support sleeves which are telescoped over the posts and engaged on the carriage support pins 32. A series of nuts 34 are threaded on threaded ends 26a of the posts 26 for clamping the carriage in assembly with the posts.

The carriage 18 is carried by upper channel-shaped rails 35 which are fixedly attached to the posts by any suitable means such as welds and the like. The rails 35 are provided with sets of spaced cam rollers 37 on which the carriage 18 is carried. More particularly, the carriage 18 is of a box-shaped configuration and has carriage legs 38 on opposite sides (FIGURE 5) which are supported between the sets of spaced cam rollers 37 carried by the rails 36. It will be appreciated that the carriage 18 is adapted to be reciprocated transversely of the posts 26 and transversely of the core box with the carriage 18 being carried on the rollers 37 by the carriage legs 38 during the course of its movement.

Also mounted on the carriage 18 is a pneumatic cylinder 39 having a piston rod 40 that is joined to the press plate 20 for moving the press plate 20 vertically with respect to the carriage 18. As shown in FIGURE 5, the piston rod 40 is directly joined with a pressure transfer plate 41. A pair of vertical posts 42, 42 connect the press plate 20 with the pressure transfer plate 41. A series of heat shields 43, 44 and 45 are mounted on the posts 42 and 42 for containing the heat generated during the formation of the cured mold at the area of the core box 11 and at the area of the press plate 20.

As previously described, the hopper 17 is carried on the carriage 18 for unloading core sand in the core box 11 about the pattern 16. In order to actuate the carriage in a transverse direction, a pneumatic cylinder 47 is provided. The cylinder has a piston rod 48 that is connected through a yoke 48a to a pair of transverse angles 49 that are secured on opposite sides of the hopper 17. Suitable controls may be provided for operating the cylinder 47 in sequential relation with respect to the other pneumatic cylinders 27 and 39. Before operation commences, it is necessary that the core box 11 be disposed in its uppermost position and engaged against upper box stops 50, 50 (FIGURE 5) so that the horizontal plane of the upper surface of the core box 11 will be correctly positioned with respect to the hopper 17. By positioning the uppermost surface of the core box and the lower edge of the hopper in essentially the same horizontal plane, the hopper edge 19 may then act as a strike to smooth or level the sand in the core box as the hopper is retracted and moved into overlying relation with respect to the sand retainer plate 51.

In order to close the supply hopper 17 when it is moved out of overlying relation with respect to the core box 11, a sand retainer plate 51 is carried between the rails 36. Also, a sand dribble collector or chute 52 is mounted between the channels 36 at one end of the plate 51 for receiving excess sand accumulations from the sand retainer plate 51.

A supply hopper 53 overlies the spread hopper 17 and is supported on the base 25 and on a supply hopper support leg 54. The supply hopper 53 has a chute 55 that is adapted to unload sand into the spread hopper 17 when the spread hopper is in a retracted position. The supply hopper 53 has a swingable gate 56 which is pivoted at one end at 57 on the supply hopper. The spread hopper 17 has a gate actuator means comprising a pin 58 which is engageable with an opposite end of the gate 56 for causing the gate to pivot on the pivot 57 thus enabling the gate to be swung to allow the spread hopper 17 to be filled with the desired amount of core sand. When the supply hopper 17 is caused to move over the core box 11, the gate 56 is again swung on its pivot into a closed position cutting off the flow of core sand from the supply hopper 53 to the spread hopper 17.

It will be appreciated that as the core sand in the core box 11 is being subjected to heat by the press plate 20 and by the heat generated in the core box supporting structure 29, the temperature of the area surrounding the core box is greatly elevated. In order to prevent the sand contained in the supply hopper 53 and in the spread hopper 17 from being preheated to an undesired extent, the heat shields 43, 44 and 45 are located above the press plate. These heat shields extend generally in a horizontal direction. In addition, a vertical heat shield 58 is mounted on one side of the spread hopper 17 between the spread hopper and the press plate 20, as shown in FIGURE 6. A cooling system is provided for the heat shield 58 and in the illustrated form of my invention, comprises a cooling header 59 which is mounted between the heat shield 58 and the spread hopper 17. A coolant inlet line 60 (FIGURE 1) is connected with a suitable pump for pumping coolant into the header 59. A coolant outlet line 61 is connected with an opposite end of the header on an opposite side of the spread hopper 17 for conveying the heated coolant back to a cooler whereupon the fluid can be recirculated through the pump again if desired.

Although minor modifications might be suggested by those versed in the art, it should be understood that I wish to embody within the scope of the patent warranted hereon, all such modifications as reasonably and properly come within the scope of my contribution to the art.

I claim as my invention:

1. A machine for foundry use comprising,
a core box adapted to contain a pattern,
carriage supporting means for supporting a carriage,
a carriage mounted on said carriage supporting means movable transversely of said core box,
a spread hopper carried on said carriage having a hopper outlet for discharging sand into said core box as said hopper is moved across said core box on said carriage,
means comprising a sand retainer plate for closing said hopper outlet when the spread hopper is moved away from overlying relation to the core box and into overlying engagement with said sand retainer plate,
a vertically movable press plate overlying said pattern for compacting the sand discharged from the hopper into the core box,
means for heating the sand in the core box to form a cured mold, and
a supply hopper being mounted above said spread hopper for supplying sand to the spread hopper,
said supply hopper having a gate for controlling the flow of sand from the supply hopper to the spread hopper,
said gate being provided with means actuatable by said carriage to open and close the gate with the gate being normally opened with the spread hopper overlies the sand retainer plate and with said gate being closed when said spread hopper overlies said core box.

2. A machine for foundry use comprising,
a core box adapted to contain a pattern,
carriage supporting means for supporting a carriage,
a carriage mounted on said carriage supporting means movable transversely of said core box,
a spread hopper carried on said carriage having a hopper outlet for discharging sand into said core box as said hopper is moved across said core box on said carriage,
means comprising a sand retainer plate for closing said hopper outlet when the spread hopper is moved away from overlying relation to the core box and into overlying engagement with said sand retainer plate,
a vertically movable press plate overlying said pattern for compacting the sand discharged from the hopper into the core box,
means for heating the sand in the core box to form a cured mold,
a supply hopper being mounted above said spread hopper for supplying sand to the spread hopper, said supply hopper having a gate for controlling the flow of sand from the supply hopper to the spread hopper,
said gate being provided with means actuatable by said carriage to open and close the gate with the gate being normally opened with the spread hopper overlies the sand retainer plate and with said gate being closed when said spread hopper overlies said core box, and
a sand dribble collector being positioned beneath said sand retainer plate for receiving particles of sand which accumulate on the sand retainer plate.

References Cited by the Examiner
UNITED STATES PATENTS

| | | | |
|---|---|---|---|
| 706,487 | 8/1902 | Battenfeld | 22—35 |
| 2,588,669 | 3/1952 | Taccone | 22—35 |
| 2,685,117 | 8/1954 | Rivers | 25—103 |
| 3,006,043 | 10/1961 | Goldhamer | 22—73 |
| 3,096,547 | 7/1963 | Hunter et al. | 22—36 |
| 3,137,902 | 6/1964 | Peras | 22—36 |

J. SPENCER OVERHOLSER, *Primary Examiner.*

MARCUS U. LYONS, *Examiner.*